(12) United States Patent
Farelli et al.

(10) Patent No.: US 10,371,593 B2
(45) Date of Patent: Aug. 6, 2019

(54) DYNAMIC BALANCER

(71) Applicant: AKRON SPECIAL MACHINERY, INC., Akron, OH (US)

(72) Inventors: Joseph A. Farelli, Berlin Center, OH (US); Byron R. Stanoszek, Hinckley, OH (US); Troy L. Anenson, Akron, OH (US); Daniel P. Furst, Stow, OH (US)

(73) Assignee: AKRON SPECIAL MACHINERY, INC., Akron, OH (US)

( * ) Notice: Subject to any disclaimer, the term of this patent is extended or adjusted under 35 U.S.C. 154(b) by 190 days.

(21) Appl. No.: 15/345,648

(22) Filed: Nov. 8, 2016

(65) Prior Publication Data

US 2018/0128704 A1 May 10, 2018

(51) Int. Cl.
*G01M 1/22* (2006.01)
*G01M 1/04* (2006.01)

(52) U.S. Cl.
CPC ............ *G01M 1/225* (2013.01); *G01M 1/045* (2013.01)

(58) Field of Classification Search
CPC .......... G01M 1/02; G01M 1/04; G01M 1/045; G01M 1/08; G01M 1/16; G01M 1/22; G01M 1/225
USPC .......................................... 73/459, 460, 462
See application file for complete search history.

(56) References Cited

U.S. PATENT DOCUMENTS

| | | | |
|---|---|---|---|
| 2,127,950 A * | 8/1938 | Bennett | G01M 1/045 73/474 |
| 4,502,328 A | 3/1985 | Wood et al. | 73/462 |
| 4,951,510 A * | 8/1990 | Holm-Kennedy | G01P 15/0802 73/510 |
| 5,383,361 A | 1/1995 | Matumoto | 73/146 |
| 5,396,436 A * | 3/1995 | Parker | G01M 1/225 700/279 |
| 5,600,062 A | 2/1997 | Moench | 73/462 |
| 6,131,455 A | 10/2000 | Matsumoto et al. | 73/462 |
| 6,308,566 B1 | 10/2001 | Matsumoto et al. | 73/462 |
| 6,658,936 B2 | 12/2003 | Matsumoto | 73/460 |
| 6,772,626 B1 | 8/2004 | Engel et al. | 73/146 |
| 7,140,242 B1 | 11/2006 | Poling, Sr. | 73/146 |
| 7,434,454 B2 | 10/2008 | Matsumoto | 73/146 |
| 7,448,267 B2 | 11/2008 | Williams et al. | 73/462 |
| 8,342,020 B2 | 1/2013 | Sumimoto et al. | 73/462 |
| 8,794,059 B2 | 8/2014 | Wollbrinck et al. | 73/146 |

(Continued)

*Primary Examiner* — Benjamin R Schmitt
(74) *Attorney, Agent, or Firm* — Renner Kenner Greive Bobak Taylor & Weber

(57) ABSTRACT

A dynamic balancer includes a support frame with a frame plate that has a spindle opening through which a spindle assembly with a rotatable spindle shaft is received. A sensor plate is coupled to at least the support frame, and at least one force sensor is coupled between the sensor plate and the spindle assembly to detect force variations therebetween as the rotatable spindle shaft rotates. A related method for detecting a balance condition of a tire includes providing a plurality of force sensors maintained in a substantially horizontal plane with respect to the tire's rotation, chucking and inflating the tire, spinning the tire to a predetermined speed, generating force data from the plurality of force sensors, calculating an imbalance condition from the force data, and marking the tire at a location of imbalance if the imbalance condition exceeds a predetermined threshold.

14 Claims, 9 Drawing Sheets

(56) References Cited

U.S. PATENT DOCUMENTS

2002/0100323 A1* 8/2002 Haeg .................. G01M 1/225
                                                          73/503
2009/0308156 A1* 12/2009 Sumimoto ........... G01M 1/045
                                                          73/462
2014/0191480 A1* 7/2014 Miyazaki ........... G01M 17/021
                                                          279/133

* cited by examiner

US 10,371,593 B2

DYNAMIC BALANCER

TECHNICAL FIELD

The present invention relates to a dynamic balancer. In particular, the present invention is directed to a dynamic balancer for determining a balance condition of a tire rotated by the balancer.

BACKGROUND ART

Manufactured tires generally undergo certain testing before being made available for sale to the public. One such test includes measuring the balance of a tire by rotating the tire at a high speed. The machines used for measuring the balance of a tire must secure the tire in position, inflate the tire, and then rotate the tire at a high speed while detecting forces during the tire's rotation.

Prior art devices typically utilize load cells that detect forces in an axial relation to the tire's rotation. Although effective in its stated purpose, it is believed that more accurate determinations of a balance condition can be obtained. Accordingly, there is a need in the art for an improved tire balancer that detects forces in a horizontal plane in relation to the tire's rotation. And there is a need to collect and process the forces detected in a meaningful way to properly identify a location and amount of a tire's out of balance condition.

SUMMARY OF THE INVENTION

In light of the foregoing, it is a first aspect of the present invention to provide a dynamic balancer.

It is another aspect of the present invention to provide a dynamic balancer comprising a support frame, a frame plate carried by the support frame, the frame plate having a spindle opening therethrough, a spindle assembly having a rotatable spindle shaft, the spindle assembly received in the support frame and extending through the spindle opening, a sensor plate coupled to at least the support frame, and at least one force sensor coupled between the sensor plate and the spindle assembly to detect force variations therebetween as the rotatable spindle shaft rotates.

Still another aspect of the present invention is to provide a dynamic balancer comprising a support frame, a spindle assembly received in the support frame, the spindle assembly having a rotatable shaft that rotates a tire, and a plurality of force sensors disposed between the support frame and the spindle assembly in a substantially horizontal plane, each force sensor generating force signals to determine a balance condition of the tire.

Yet another aspect of the present invention is to provide a method for detecting a balance condition of a tire comprising: providing a plurality of force sensors maintained in a substantially horizontal plane with respect to the tire's rotation, chucking and inflating the tire, spinning the tire to a predetermined speed, generating force data from the plurality of force sensors, calculating an imbalance condition from the force data, and marking the tire at a location of imbalance if the imbalance condition exceeds a predetermined threshold.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

A dynamic balancer for measuring the balance of a tire or other toroidal body is generally indicated by the numeral 10 in FIGS. 1-4. As will be discussed in detail below, the dynamic balancer 10 tests toroidal bodies, such as tires, to determine imbalance characteristics such as a position of imbalance, a weight of the imbalance, a coupling force of the imbalance, and related data. Generally, the tire is received on the balancer and secured thereto by a locking mechanism. The tire is then inflated and rotated at a relatively high speed such as 400 rpm. Force sensors may then be provided in a horizontal plane in relation to the rotation of the tire to measure forces. The data from the force sensors and other input may be sent to a controller to determine the imbalance characteristics and generate reports or machine instructions to mark or further process the tested tire.

Figure 1:
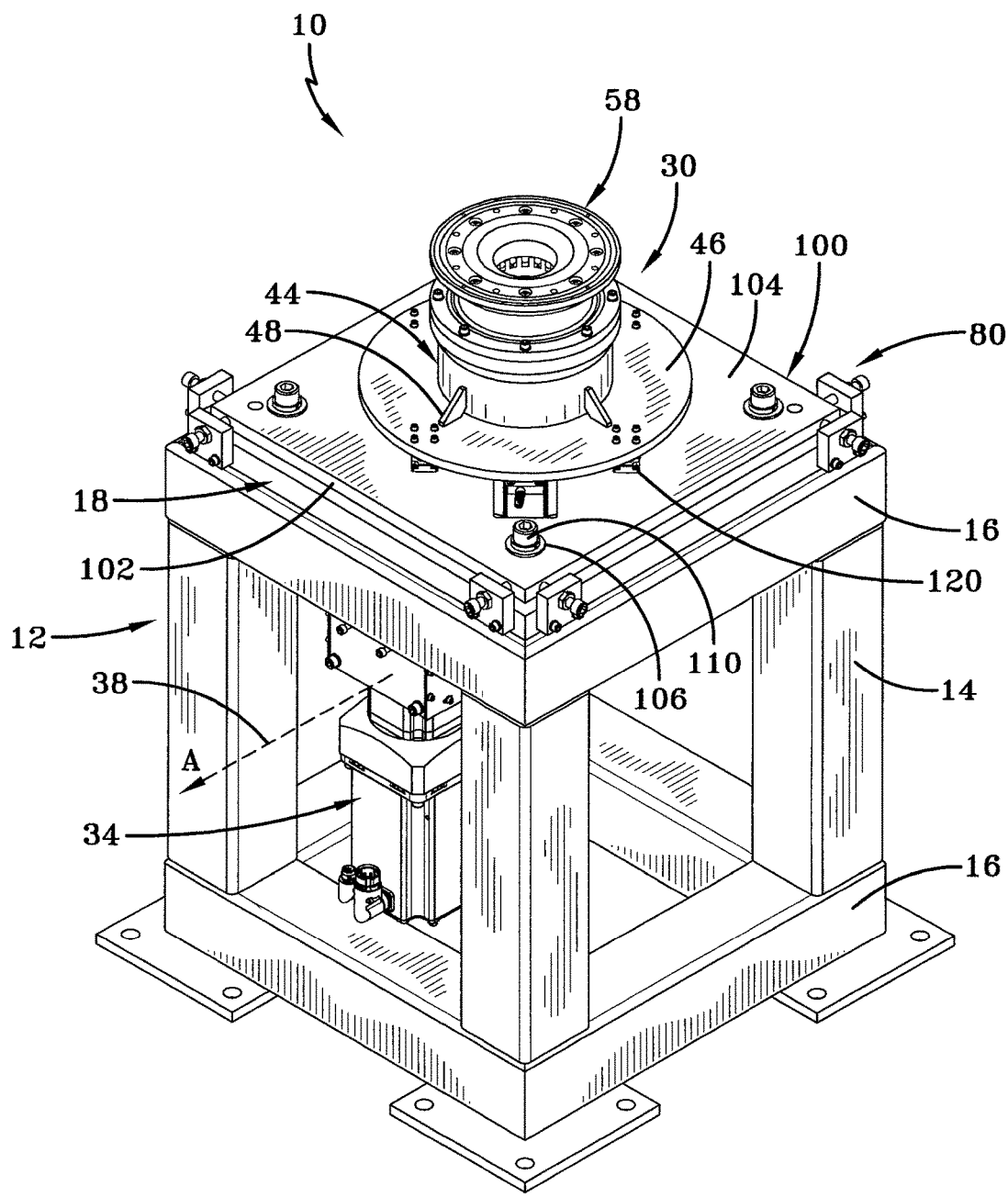
FIG. 1 is a perspective view of a dynamic balancer according to the concepts of the present invention.
Figure 2:
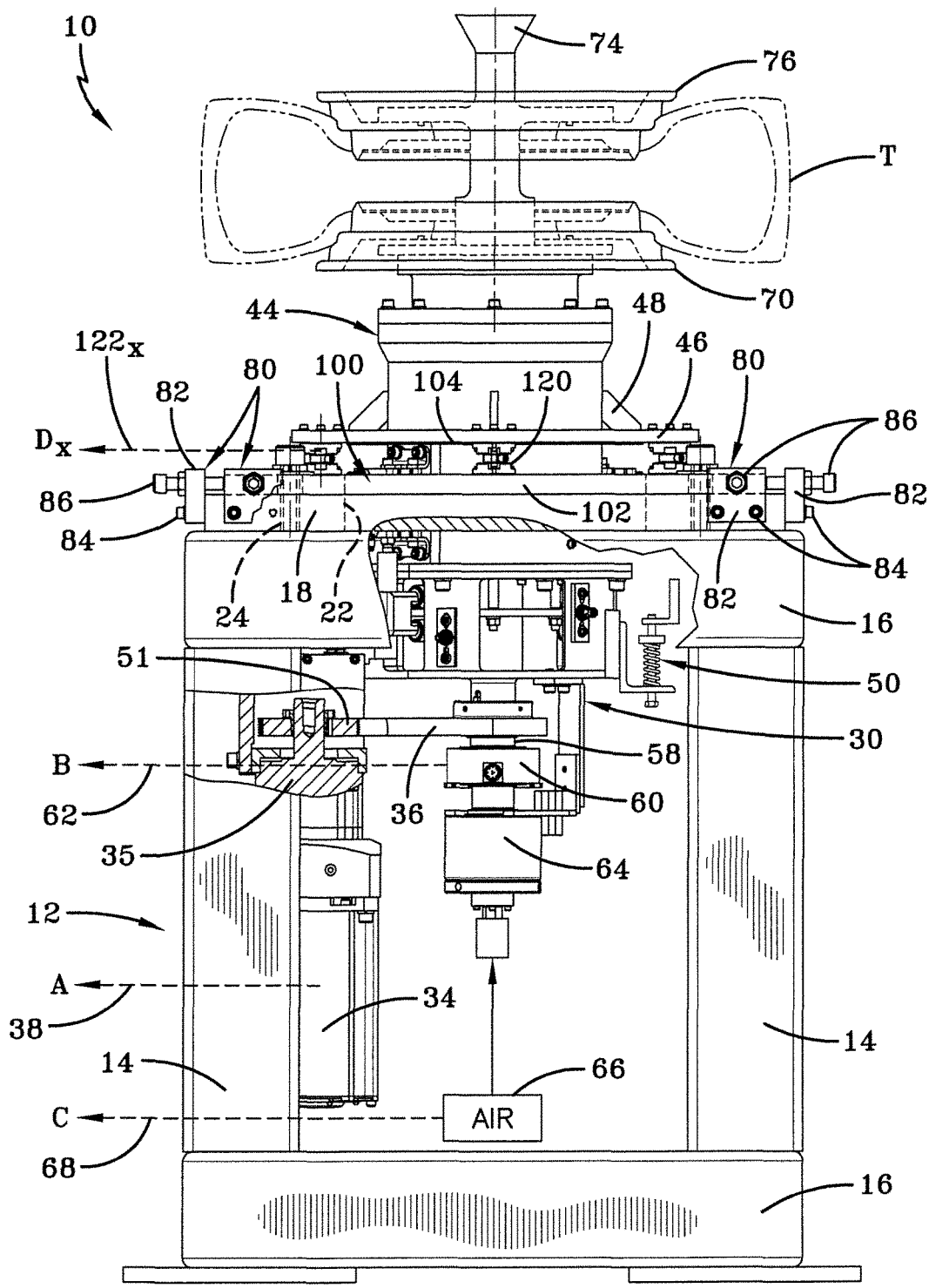
FIG. 2 is a side elevational view of the dynamic balancer according to the concepts of the present invention.
Figure 5:
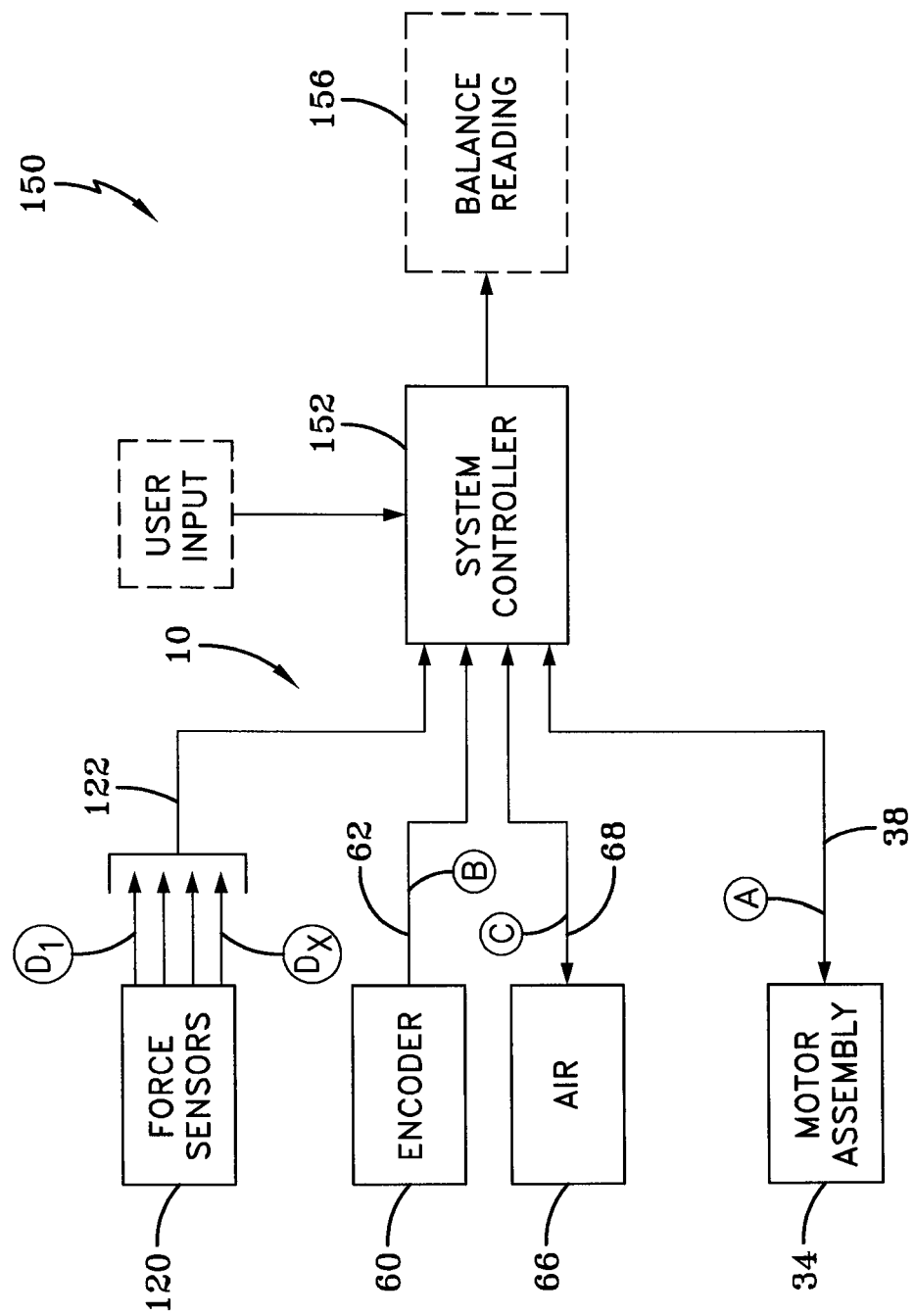
FIG. 5 is a schematic diagram of a control system utilized in the operation of the dynamic balancer according to the concepts of the present invention.

The dynamic balancer includes a support frame 12 that is secured to a floor or other stationary surface. The frame 12 may include upwardly standing legs 14 which may be interconnected at or near top and bottom ends by cross-frame members 16. Additional cross-frame members may be employed as needed. A frame plate 18 may be supported by the upper cross-frame members. As best seen in FIGS. 2 and 5, the frame plate 18 provides a spindle opening 22 therethrough, wherein the opening 22 may be generally centrally positioned within the frame plate 18. A number of lock down openings 24 extend through the frame plate 18 and are positioned about the outer periphery of the spindle opening 22. In the embodiment shown, four openings 24 are provided and they are spaced in substantially equal angular increments from one another about the opening 22. Other embodiments may employ a different number of openings 24. And the openings 24 may be equally or unequally angularly spaced about the spindle opening 22. In the present embodiment, the openings 24 are internally threaded so as to receive fastening bolts or the like. As will be appreciated as the description proceeds, other fastening mechanisms may be received in the openings 24.

A spindle assembly 30 is received in, but not fixed to, the support frame 12 wherein an outer portion of the spindle assembly 30 is supported and carried by the support frame and a spindle, to be discussed, is rotatable within the outer portion. As the detailed description proceeds it will be appreciated that the spindle assembly is supported in such a way that forces observed during rotation of a tire by a rotatable spindle within the spindle assembly are not affected by the manner in which the spindle assembly is supported.

A motor assembly 34 may be carried by the spindle assembly 30 and is coupled to an appropriately configured gearbox 35 in order to rotate a tire mounted to the spindle assembly at an appropriate speed. The motor assembly 34 through the gearbox 35 rotates a connected belt 36 that is coupled to a rotatable portion of the spindle assembly 30. The motor assembly 34 receives a motor signal 38, which is also designated by the capital letter A, from a system controller, as will be discussed. Skilled artisans will appreciate that the system controller may also receive feedback and/or operating performance of the motor assembly via signal line 38.

The spindle assembly 30 includes a main housing 44 (or outer portion) that extends through the spindle opening 22. Radially extending from the main housing 44 is an outer housing plate 46 which may be connected to one another by a plurality of gussets 48. To assist in maintaining the spindle assembly within the frame 12, a counter-balancing bracket 50 may be mounted to an underside of the frame plate 18, and/or the cross-frame members 16, and/or the legs 14; and to the main housing 44. The counter-balancing bracket 50 may provide for a threaded bolt received through a compressible spring to assist in supporting the spindle assembly with respect to the support frame 12. In other words, the counter-balancing bracket 50 may be used to counterbalance the weight of the motor assembly 35, gearbox 35 and associated components and ensure an optimal angular orientation of the spindle assembly with respect to the frame 12. A mounting bracket 51 may also be employed to couple a portion of the main housing 44 to the gearbox 35 and/or motor assembly 34.

Extending from both ends of the main housing 44 is a rotatable spindle shaft 58 which rotates within the main housing and which is rotated by the belt 36. In the present embodiment, the spindle shaft is hollow or at least provides air passages therethrough to facilitate the inflation and/or deflation of a mounted tire. Skilled artisans will further appreciate that appropriate bearings are provided between the rotatable spindle shaft 58 and the main housing 44 so as to allow for rotation of the shaft at the desired speeds. Coupled to the spindle shaft 58 is an encoder 60 and in the present embodiment the encoder is mounted below the belt 36. The encoder monitors the angular position of the spindle shaft and generates an encoder signal 62, which may also be designated by the capital letter B, and which is transmitted to the system controller as will be discussed. In one embodiment the encoder is a 2000-point linear incremental encoder which reports values for positions 0 to 1999 based on the angular position of the spindle shaft. Of course, a different number of positions could be used if desired.

A rotary union 64 is positioned below the encoder and is coupled to the spindle shaft 58. The rotary union 64 is further connected to a pressurized air supply 66 which inflates a mounted tie as needed, wherein the air supply 66 generates a pressure signal 68 that is received by the system controller and which may also be designated by the capital letter C. The pressure signal 68 is utilized to monitor the inflation pressure of the tire once it is secured to the spindle assembly 30.

A lower tire rim 70 is secured to an upper end of the spindle shaft 58 and is configured so as to receive various sized diameters of tires and, in particular, a bead of a tire designated by capital letter T. A locking member 74 with a corresponding upper tire rim 76 is received in the spindle shaft 58 when the tire is mounted to the dynamic balancer. The locking member 74 functions to hold the tire in place during the balancing test. A detailed operation of an exemplary locking mechanism associated with an exemplary balancer is disclosed in U.S. patent application Ser. No. 15/166,456 filed on May 27, 2016 entitled Apparatus For Holding A Tire In A Tire Balancing Machine which is incorporated herein by reference. Of course, other embodiments for securing and rotating a tire may be employed in conjunction with the concepts of the present invention disclosed herein. Skilled artisans will appreciate that the air supply and associated pressurized air is routed through the rotary union 64, through the hollow shaft of the spindle 58, and into the tire prior to and during testing.

A plurality of lateral adjustment mechanisms 80 may be mounted to the frame plate 18 and are used, as will be described, to precisely orient the positioning of force sensors. In the embodiment shown, each lateral adjustment mechanism is mounted on each side of the frame plate and near the corners of each side of the frame plate. Each mechanism 80 may include an adjustment plate 82 which is secured to the side of the frame plate by a pair of threaded fasteners 84. Of course, other methods of securing the adjustment plate to the frame plate may be employed as desired. Each adjustment plate also provides for an adjustable socket head cap screw 86 or the like that may be axially moved with respect to the adjustment plate 82.

Figure 3:
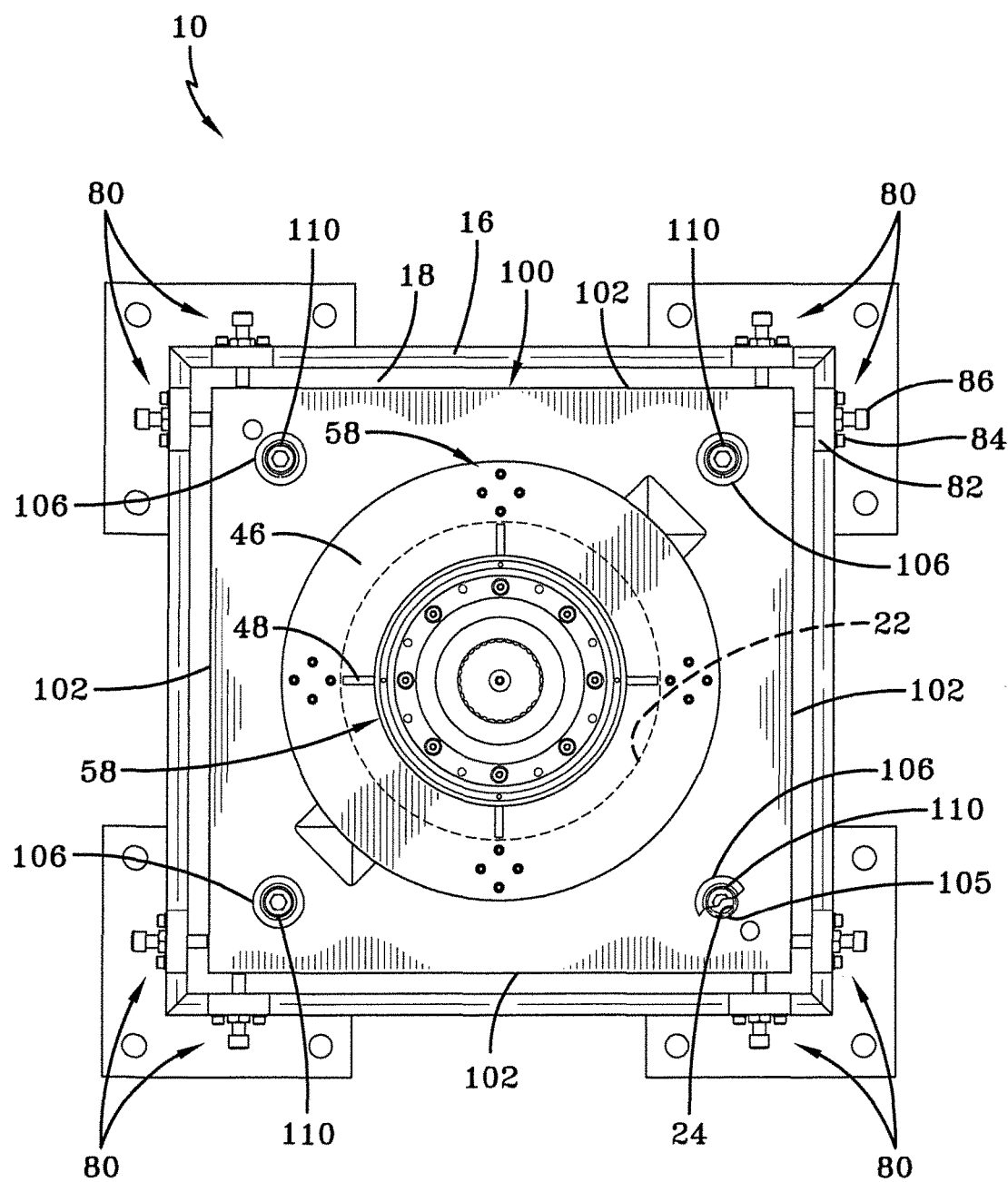
FIG. 3 is a top view of the dynamic balance according to the concepts of the present invention.
Figure 4:
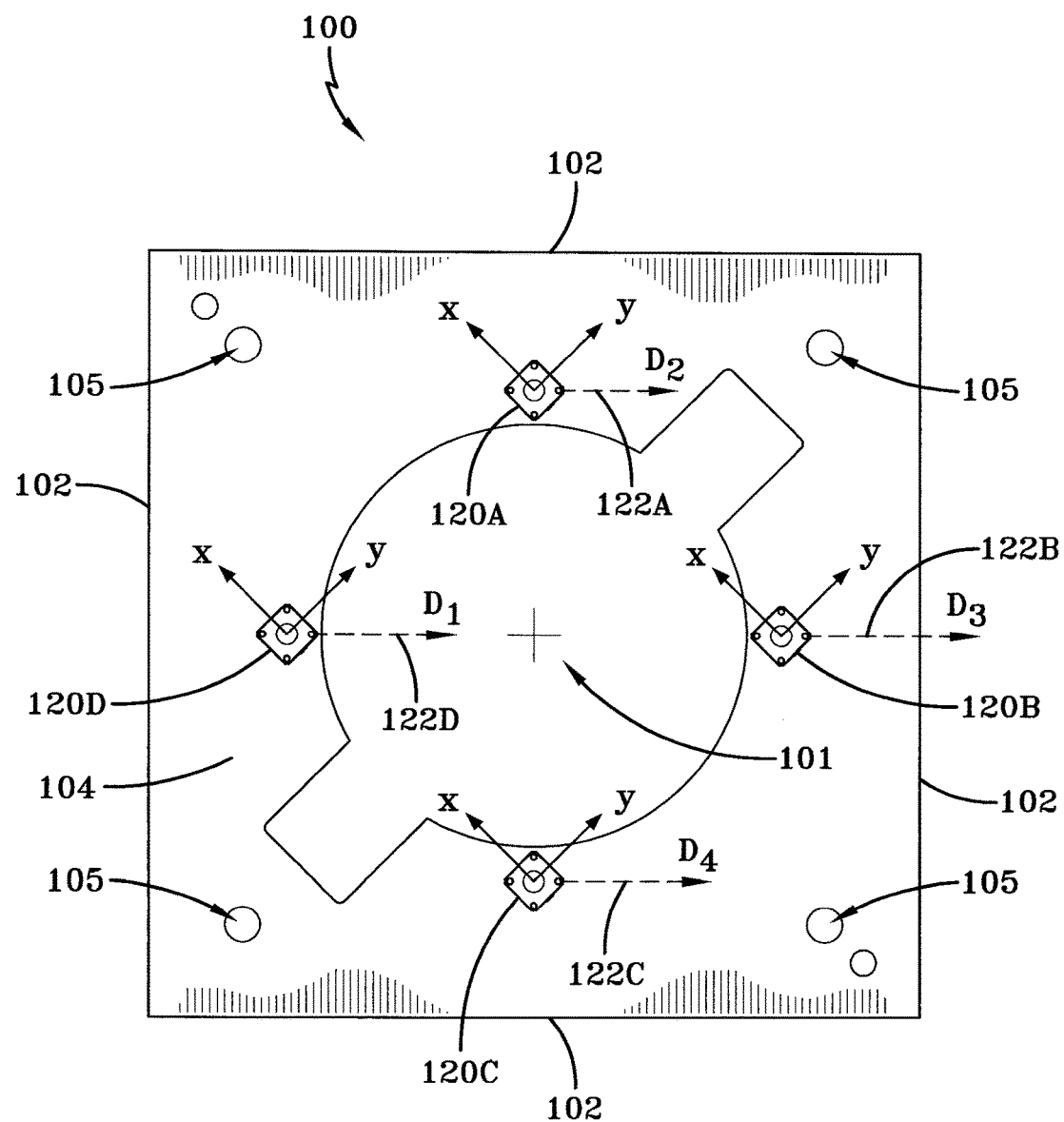
FIG. 4 is a top view of a sensor plate utilized in the dynamic balancer according to the concepts of the present invention.

As best seen in FIGS. 3 and 4, a sensor plate 100 may be positioned on the frame plate 18. The sensor plate 100 also provides for a sensor plate opening 101 which receives the spindle assembly 30 therethrough. The sensor plate 100 provides lateral edges 102 that are connected to one another and a top surface 104 which is opposite the frame plate 18. The sensor plate 100 has a plurality of bolt openings 105 extending therethrough, wherein each bolt opening 105 is generally aligned with a corresponding lock down opening 24 that extends through the frame plate 18. A lock down washer 106 may be associated with at least each opening 105. A lockdown bolt 110 is receivable in the bolt openings 105 and functions with the washer to secure the sensor plate 100 to the frame plate 18. Skilled artisans will appreciate that the outer diameter of each bolt 110 is smaller in diameter than the bolt opening 105 in which it is received. As such, the sensor plate 100 is movable upon the frame plate to allow for lateral positioning of the sensor plate by movement and adjustment of the screws 86 associated with the lateral adjustment mechanisms 80. Specifically, the lateral edges of the sensor plate 100 are movable by the screws 86 and when a desired position is obtained, the lockdown bolts 110 and associated washers 106 are tightened to an appropriate fastener underneath the frame plate such that the sensor plate 100 is grounded or fixed with respect to the frame plate 18.

A plurality of force sensors 120, wherein each sensor has a different alphabetic suffix A, B, etc., are mounted to the sensor plate 100 and, in particular, to the top surface 104. The force sensors 120 also come in contact with an underside of the outer housing plate 46. In other words, the force sensors are disposed between the sensor plate 100 and the outer housing plate 46. As a result, the entire weight of the spindle assembly is supported by the force sensors. As such, any force, or change in force, exerted by rotation of the tire through the spindle assembly 30 and the outer housing plate is detected by the sensors 120. Skilled artisans will appreciate that the sensors, sometimes referred to as load cells, may be of any type that detects an applied force or change in force and generates a corresponding electrical signal. The sensors may be in the form of a strain gage or piezoelectric type device. Each of the force sensors 120 generates a sensor signal 122, with a corresponding alphabetic suffix, which is also designated by the capital letter D and a corresponding subscript ($_{1,2,3,x}$). As such, each "sensor signal" 122 may include multiple signals representing all of the different component force values. All of the sensor signals 122 are received by a system controller as will be discussed. Each sensor may generate a signal that includes component force values in the x, y and z orientations. The force sensors 120 are arranged about the sensor plate in an equidistant relationship to one another and in a positional relationship about the main housing 44 of the spindle assembly 30. In the embodiment shown, the force sensors are positioned about 90° from each other about the spindle shaft's axis of rotation. And, as seen in FIG. 4, the x and y component forces from each sensor are oriented in the same direction. The z component forces are also oriented in the same direction in to the page. Each force sensor then detects at least one or more force component generated by the sensor for further analysis. In any event, each force sensor may be positioned equidistantly from a center axis of the spindle assembly so that no force sensor is in a position further from the center of the spindle assembly than another. This is accomplished by properly positioning the sensor plate with respect to the frame plate and locking the sensor plate in position as discussed above in regard to the lateral adjustment mechanisms. As such, each force sensor generates a similar signal so as to properly detect the out of balance portion of the tire as the tire is rotated during the balancing test.

Referring now to FIG. 5, it can be seen that a control system for the dynamic balancer is designated generally by the numeral 150. The system 150 includes a system controller 152 which provides for the necessary hardware, software, and memory for receiving various inputs from components of the dynamic balancer 10 and a user input and generating an output which assists the technician in determining the balance condition of the tire under test.

The controller 152 receives inputs from the air supply 66, which is an indication of the tire's pressure during rotation, the encoder 60 which determines the tire's angular position during the test, and the plurality of force sensors each of which detects the forces and/or changes in force that are generated as the tire is rotated by the spindle shaft 58. In other words, as a tire is rotated, the tire exerts forces that are transmitted through the spindle shaft, the bearings between the spindle shaft 58 and the main housing 44 and then to the outer housing plate 46. As a result, the forces are transmitted by the spindle assembly to the frame plate through the interposed force sensors 120 and are indicative of the tire's balance condition. The controller 152 then processes the received signals from the force sensors and generates a balance reading 156 of the tire. It will further be appreciated that user input 154 may be supplied to the controller 152 which allows for filtering and/or adjustment of the analysis of the data signals received by the controller 152. Utilizing the balance reading report, the tire under test can be appropriately marked as being acceptable for use or the like.

Figure 6:
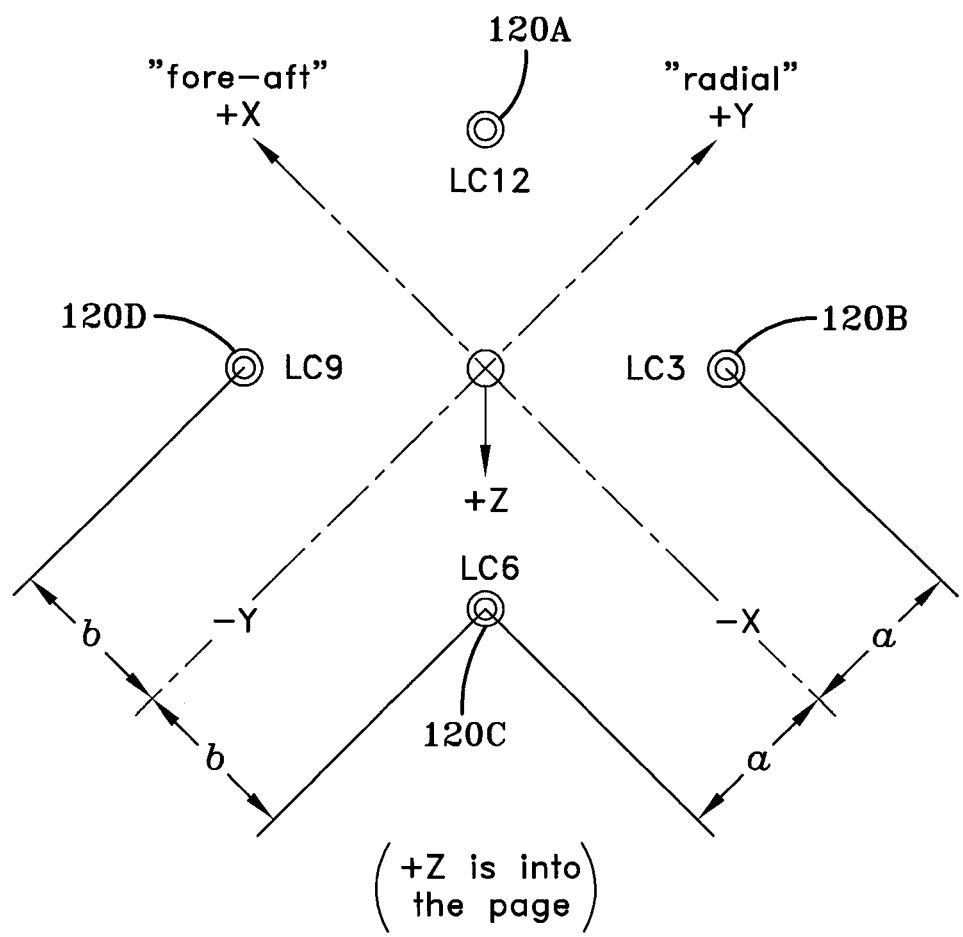
FIG. 6 is a schematic diagram of a plurality of force sensors disposed between a sensor plate and a force plate used in the dynamic balancer according to the concepts of the present invention.

Referring now to FIG. 6, a layout of the force sensors utilized in the dynamic balancer 10 is shown. As can be seen, the sensors are arranged on a horizontal plane around a center point of the spindle axis at 90° angles—each an equal distance from the center. The force sensors are identified as LC12, LC3, LC6 and LC9, wherein those numbers represent the numbers on the face of a clock and correspond to the force sensors 120 A-D. Skilled artisans will appreciate that each sensor measures force in three directions: X, Y, and Z. Each axis provides a positive or negative value signifying compression or tension of the force sensor in the specified direction. Moreover, each force sensor is aligned with respect to each other, such that each of their three measured axes are all pointing in the same direction. As appreciated in viewing FIG. 2, a test tire T is chucked on to a set of rims 70 and 76 positioned some distance above the horizontal plane containing the force sensors disposed between the force plate and the sensor plate. Additionally, the weight of the tire produces a weight onto all four load cells in the positive (+Z) direction. As such, given any three measurements, one is able to calculate the moments about the axes. Such an equation takes into consideration the constants a and b which correspond to the distance on the given axes between the load cells. The constant c is negative of the height between the tested tire and the load cell.

Figure 7:
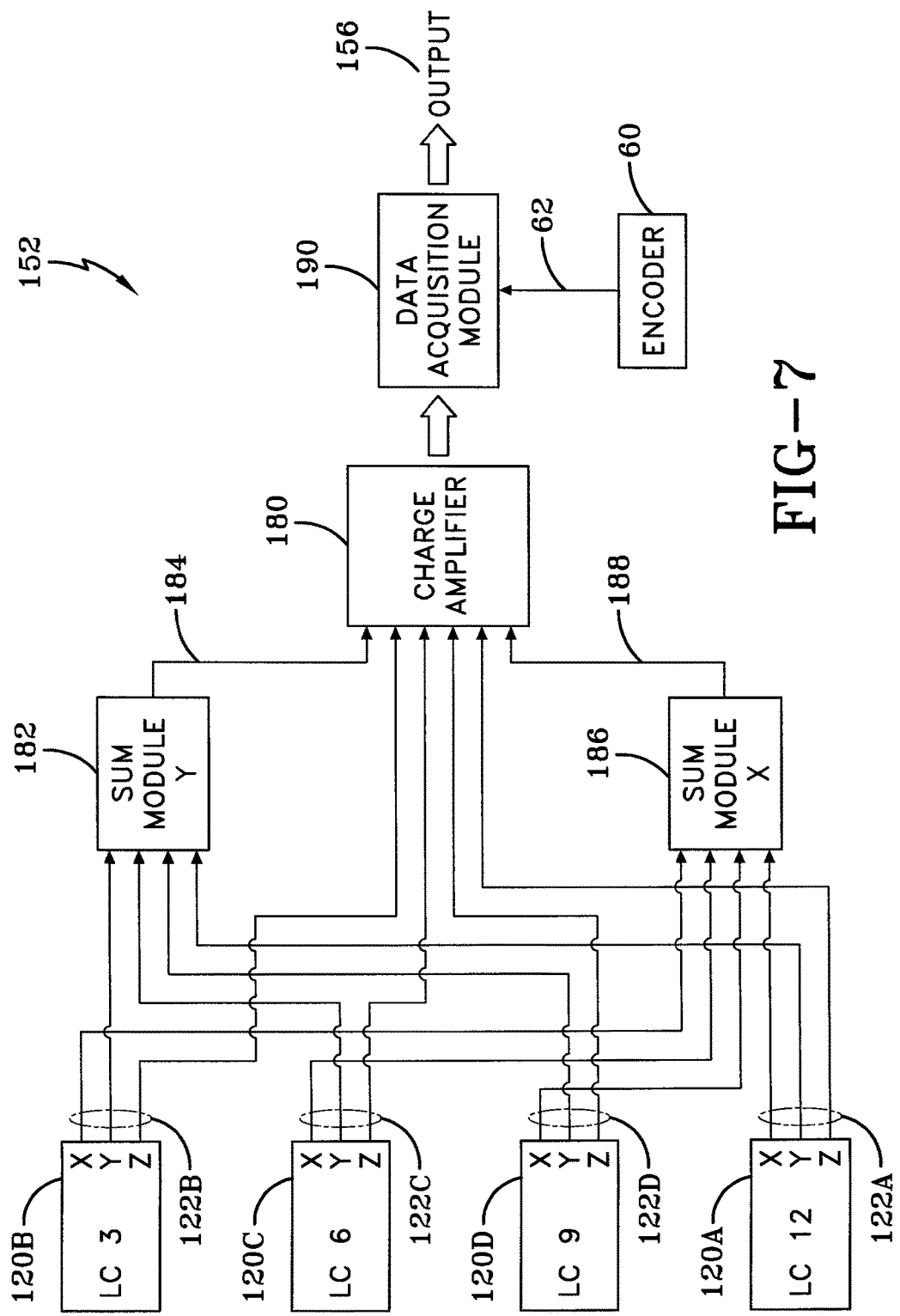
FIG. 7 is a schematic diagram showing a detailed representation of a control system utilized in the operation of the dynamic balancer according to the concepts of the present invention.

In order to obtain a location and weight of imbalance, the balancing machine 10 calculates a static and couple imbalance and the weight of correction for both static and couple imbalances. Static imbalance and its weight of correction require the sum of the forces in the Y direction ($Fy=Fy_{12}+Fy_3+Fy_6+Fy_9$). Couple imbalance and its weight of correction require the moment about the X axis (Mx), given by the following equation:

$$Mx = \vec{a}\,(Fz_{12}+Fz_3-Fz_6-Fz_9) - \vec{c}\,(Fy) \qquad \text{Equation 1}$$

where $Fz_{12}$ represents the Z axis forces detected by the force sensor LC12, and so on. Accordingly, referring now to FIG. 7, the controller 152 receives sensor signals 122A-D into several components. In particular, the sensors 120A, 120B, 120C, and 120D are connected to a charge amplifier 180 and sum modules 182 and 186. In the present embodiment the charge amplifier 180 is responsible for maintaining a charge in a piezoelectric element—typically quartz—which is maintained in the force sensor. Any compression or tension on this element creates a very small change to the charge, which is measured in picocoulombs by the charge amplifier. The charge amplifier converts this measurement to voltage in the range of +/−10V via analog circuitry. After some amount of time, the remaining charge in the force sensor dissipates to the level where physical changes to the force sensor cannot be sensed anymore. Accordingly, each force sensor must be charged periodically. Each charge event also tares measured levels to zero. The balancer machine thus charges the force sensors after the tire has been chucked, inflated and spinning in the balancer so that only variances in the force applied to the force sensors due to the rotation of the tire are measured.

The charge amplifier directly receives all of the Z force signals from the sensors 120A-D. The sum module Y 182 receives all of the Y force signals from the sensors 120A-D. In a similar manner, a sum module X 186 receives all of the X force signals from the sensors 120A-D. The sum module Y 182 generates a sum signal 184 that is received by the charge amplifier 180, and in a similar manner the sum module X 186 generates a sum signal 188 that is also received by the charge amplifier 180. Connected to the charge amplifier 180 is a data acquisition module 190. The module 190 also receives the encoder signal 62 generated by the encoder 60.

In operation, the module 190 samples the voltages generated by the charge amplifier 180. In one embodiment the data acquisition module 190 samples all signals received at 13,333 times per second from the charge amplifier 180. And, at this data rate, the module 190 samples the state of the encoder 60 2,000 times. As such, when the tire is spinning in the machine at a value such as 400 RPM, approximately 2,000 points of data per revolution can be obtained $$\left(13333 \text{ Hz} \div \frac{400 \text{ RPM}}{60 \text{ sec}} = 2000 \text{ samples per revolution}\right).$$

The controller then samples these 2,000 points per revolution from each signal of interest and converts them to distinct waveforms. In the present embodiment, the equation for the moment about X is calculated for each data point in the waveform. A Discrete Fourier Transform is then applied to each waveform to obtain a first harmonic and highpoint angle of that waveform. The first harmonic and highpoint angle of the sum of the Y signals (Fy) is used to calculate static imbalance and its weight of correction. In a similar manner, the first harmonic and highpoint angle of the moment about X (Mx) is used to calculate the couple imbalance and its weight of correction.

Figure 8:
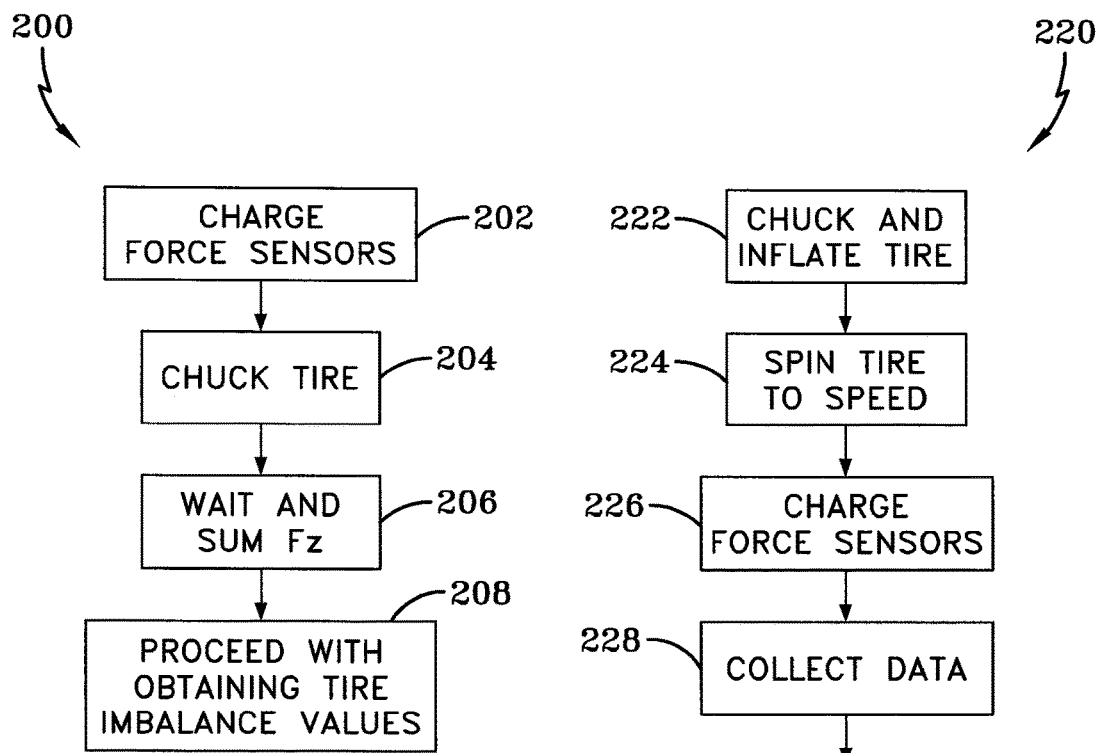
FIG. 8 is an operational flow chart showing a process for obtaining a tire weight utilizing the dynamic balancer according to the concepts of the present invention.
Figure 9:
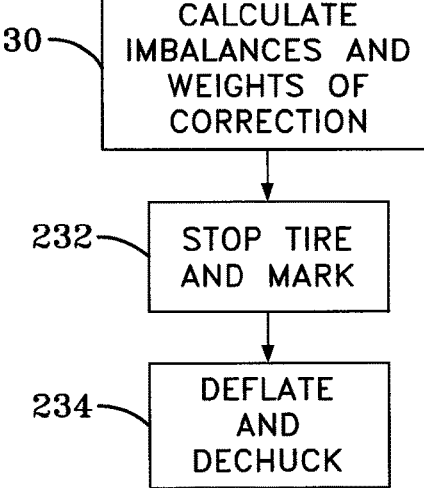
FIG. 9 is an operational flow chart showing a process for operating the dynamic balancer to obtain a static/couple imbalance and weight of correction as the tire is rotated by a motor according to the concepts of the present invention.
Figure 10:
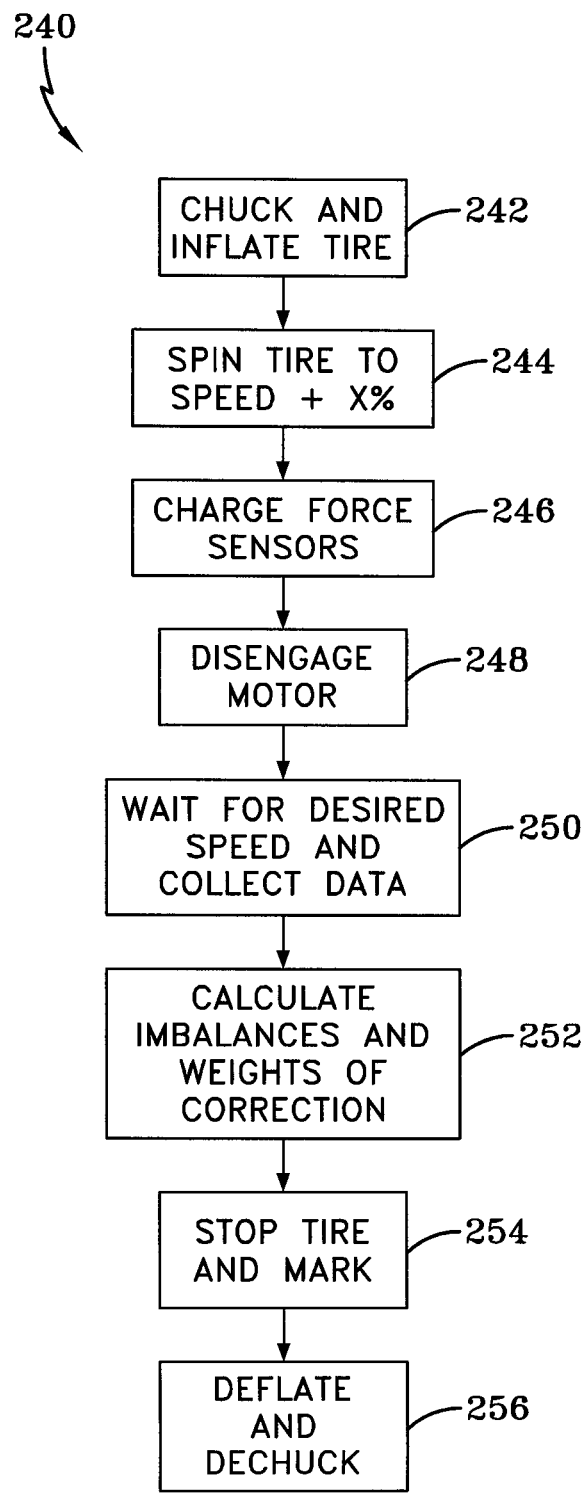
FIG. 10 is an operational flow chart showing a process for operating the dynamic balancer to obtain a static/couple imbalance and weight of correction as the tire is allowed to rotate freely at a predetermined speed according to the concepts of the present invention

Referring now to FIGS. 8-10, operational steps for obtaining a tire weight and the various imbalance values and weights of correction are shown.

FIG. 8 sets out the methodology utilized to obtain a weight of the tire which may then be used for other purposes or skipped entirely. The method for weighing the tire is generally represented by the numeral 200. At a first step the force sensors are charged by the charging amplifier 180 (as previously described) at step 202. Next, a tire is received and chucked into the balancing machine at step 204. After a predetermined wait time, such as one second, the data acquisition module 190 sums all of the Z force signals (Fz) to obtain the total tire weight. Next, at step 208 the method may proceed with obtaining tire imbalance values as set forth in either FIG. 9 or 10.

FIG. 9 sets out the steps, designated generally by the numeral 220, for obtaining tire imbalance values. At step 222, a tire is received by the balancer, chucked into position and then inflated. Next, at step 224 the tire is rotated by the motor assembly to a predetermined speed. In the present embodiment, the speed is set to 400 RPM, although skilled artisans will appreciate that other speeds may be utilized. Next, at step 226 the force sensors are charged so as to tare the measured values to zero. Next, at step 228, data from the force sensors are collected for a single revolution of the tire. If desired, data may be collected from additional revolutions for additional analysis. Next, at step 230 the data collected at step 228 is utilized to calculate the static and couple imbalance for the tire and also their weights of correction. Next, the tire is stopped by the motor utilizing data from the controller at the position for marking its largest imbalance. Finally, the tire is deflated and removed from the chuck to the next process step where the tire may be marked if predetermined thresholds are exceeded.

Referring now to FIG. 10, a procedure for determining the couple imbalance and weight of correction utilizing a freespin methodology is designated generally by the numeral 240. In this embodiment, the tire is again chucked and inflated at step 242. Next, at step 244, the tire is rotated to a predetermined speed plus a predetermined percentage of the speed. For example, the tire may be rotated to a speed of about 440 RPM which is ten percent over the nominal value presented in the prior method. Next, at step 246 the force sensors are charged so as to tare the measured values to zero. Next, at step 248 the motor is disengaged from the spindle shaft so that the tire is freely spinning upon the spindle shaft.

At such time that the tire slows through the predetermined speed value, such as 400 RPM, the data acquisition module then collects data for one revolution as the tire slows through that value. Next, at step 252 the static and couple imbalance and their weights of correction are calculated. Then, as in the previous embodiments, the tire is stopped at the position for marking its largest imbalance at step 254 and at step 256 the tire is deflated and removed from the chuck to the next process step where the tire may be marked if predetermined thresholds are exceeded.

Skilled artisans will also appreciate that a dynamic imbalance measurement, for both upper and lower planes of the tire, may be calculated from the static and couple imbalance values referred to above. The dynamic imbalance is the vector addition of the static imbalance and the couple imbalance, this being done in each balance plane. Accordingly, by determining the pure static imbalance of the tire under test plus its couple (or pure dynamic imbalance), a dynamic imbalance condition can be determined.

The dynamic balancer and related methods of data collection disclosed herein are believed to be advantageous in that a more accurate determination of the load balance condition can be obtained. It is also believed that by placing the force sensors in a horizontal plane that is parallel to the tire's plane of rotation, instead of in radial positions about the spindle's axis of rotation, that a more reliable assessment of the tire's balance condition can be determined.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A dynamic balancer to determine a balance condition of a tire, comprising:
   a support frame;
   a frame plate carried by said support frame, said frame plate having a spindle opening therethrough;
   a spindle assembly having a rotatable spindle shaft which rotates the tire, said spindle assembly received in said support frame and extending through said spindle opening;
   a sensor plate positioned on and movable with respect to at least said frame plate, said sensor plate having a sensor plate opening which receives said spindle assembly; and
   a plurality of force sensors all positioned in a single plane substantially parallel to the tire's plane of rotation, said plurality of force sensors coupled between said sensor plate and said spindle assembly about said rotatable spindle shaft's axis of rotation to detect force variations therebetween as said rotatable spindle shaft rotates.

2. The dynamic balancer according to claim 1, further comprising:
a plurality of lateral adjustment mechanisms, each said lateral adjustment mechanism having an adjustment plate that is fixed to said frame plate, each said adjustment plate having an adjustable screw received therein that is engageable with said sensor plate.

3. The dynamic balancer according to claim 2, further comprising:
an outer housing plate radially extending from said spindle assembly, wherein said plurality of force sensors are disposed between said outer housing plate and said sensor plate.

4. The dynamic balancer according to claim 3, further comprising:
an encoder coupled to said rotatable spindle shaft to detect an angular position of said rotatable spindle shaft.

5. The dynamic balancer according to claim 4, further comprising:
an air supply coupled to said rotatable spindle shaft, which is hollow, wherein a tire is mounted to said rotatable spindle shaft and inflated through said rotatable spindle shaft via said air supply.

6. The dynamic balancer according to claim 5, further comprising:
a controller which receives signals from said plurality of force sensors, said encoder and said air supply to determine balance characteristics of the tire during rotation of the tire.

7. The dynamic balancer according to claim 6, wherein said plurality of force sensors are positioned about 90° from each other about said rotatable spindle's axis of rotation, and wherein each said force sensor detects at least two force components.

8. The dynamic balancer according to claim 7, wherein said plurality of sensors are equidistantly spaced about said rotatable spindle's axis of rotation.

9. The dynamic balancer according to claim 7, wherein each said force sensor detects force components in the x, y and z axes.

10. The dynamic balancer according to claim 2,
said sensor plate having a plurality of bolt openings extending therethrough and said frame plate having a plurality of lockdown openings extending therethrough which are correspondingly aligned with said plurality of bolt openings and which receive a corresponding bolt,
wherein said adjustable screws position said sensor plate with respect to said frame plate to a desired position and said bolts fix said sensor plate to said frame plate when the desired position is set.

11. A dynamic balancer to determine a balance condition of a tire, comprising:
a support frame;
a spindle assembly received in and rotatable with respect to said support frame, said spindle assembly having a rotatable shaft that rotates the tire, said spindle assembly having an outer housing plate extending radially therefrom;
a plurality of force sensors all positioned in a single plane substantially parallel to the tire's plane of rotation, said plurality of force sensors disposed between said support frame and said outer housing plate in a substantially horizontal plane about said rotatable shaft's axis of rotation, each said force sensor generating force signals to determine a balance condition of the tire, wherein each said force sensor measures forces in three directions and wherein said plurality of force sensors are aligned with each other such that each of their three measured axes are respectively pointing in the same direction; and
a sensor plate positioned on and movable with respect to at least said frame plate, said sensor plate having a sensor plate opening which receives said spindle assembly, wherein said sensor plate has a plurality of bolt openings extending therethrough and said frame plate has a plurality of lockdown openings extending therethrough which are correspondingly aligned with said bolt openings and which receive a corresponding bolt.

12. The dynamic balancer according to claim 11, further comprising:
a summing module that receives a Y orientation signal from each of said force sensors to generate a summed signal; and
a charge amplifier to receive said summed signal and a Z orientation signal from each of said force sensors and generating corresponding amplified signals.

13. The dynamic balancer according to claim 12, further comprising:
a data encoder coupled to said rotatable shaft to generate an angular position signal; and
a data acquisition module to receive said amplified signals and said angular position signal to determine a static imbalance, a couple imbalance, and a weight of correction for said static imbalance and said couple imbalance.

14. The dynamic balancer according to claim 11, further comprising:
a plurality of lateral adjustment mechanisms, each said lateral adjustment mechanism having an adjustment plate that is fixed to said frame plate, each said adjustment plate having an adjustable screw received therein that is engageable with said sensor plate,
wherein said adjustable screws position said sensor plate with respect to said frame plate to a desired position and said bolts fix said sensor plate to said frame plate when the desired position is set.

* * * * *